US006405221B1

(12) United States Patent
Levine et al.

(10) Patent No.: US 6,405,221 B1
(45) Date of Patent: *Jun. 11, 2002

(54) METHOD AND APPARATUS FOR CREATING THE APPEARANCE OF MULTIPLE EMBEDDED PAGES OF INFORMATION IN A SINGLE WEB BROWSER DISPLAY

(75) Inventors: Frederick E. Levine, Boulder, CO (US); Frank E. Ludolph, Menlo Park, CA (US)

(73) Assignee: Sun Microsystems, Inc., Palo Alto, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 106 days.

(21) Appl. No.: 08/546,180

(22) Filed: Oct. 20, 1995

(51) Int. Cl.$^7$ ................................................ G06F 17/21
(52) U.S. Cl. ...................... 707/501.1; 707/513; 707/517
(58) Field of Search ................................. 395/793, 784, 395/785, 326, 335, 346, 352; 707/104, 501.1, 513, 517, 520, 522, 523; 345/329, 330, 331, 332, 335, 346, 352

(56) References Cited

U.S. PATENT DOCUMENTS

| 5,491,795 A | * | 2/1996 | Beaudet et al. | 395/346 |
| 5,530,852 A | * | 6/1996 | Meske, Jr. et al. | 395/610 |
| 5,535,422 A | * | 7/1996 | Chiang et al. | 395/338 |
| 5,572,643 A | * | 11/1996 | Judson | 395/793 |

OTHER PUBLICATIONS

Cowart, Mastering Windows™ 3.1 Special Edition, SYBEX, 1993, pp. 104–107.*

Lavapuro, "Mozilla 2.0a Release Notes", BrowserWatch, http://browserwatch.internet.com/news/story/netscape29.html, Sep. 15, 1995, pp. 1–2.*

"Netscape Navigator 2.0 for Windows", http://home.netscape.com/eng/mozilla/2.0/relnotes/windows–2.0.html, 1998, pp. 1–14.*

Brown, Using Netscape 2, Special Edition, QUE Corporation, Sep. 1995, pp. 31–34 and 773–786.*

* cited by examiner

Primary Examiner—Stephen S. Hong
(74) Attorney, Agent, or Firm—William J. Kubida; Stuart T Langley; Hogan & Hartson LLP

(57) ABSTRACT

A method of and apparatus for displaying multiple, user preferentially linked pages of at least one document on a display screen adapted for Web or network viewing of pages of data by a browser program. This is accomplished by creating at least a template page having substantial portions thereof of user data and defining a first predetermined substantially static area on a display screen. A second predetermined static area on the template page is created to give the appearance of a window on the screen, the window having the capability of receiving a plurality of variable but user requested subsection of data therein, the subsections being linked to the template page and to each other. The user may choose a selectable control on the static portion of the display screen to permit the selection of specific linked subsections of data for viewing in the second predetermined static area on the template page. The first and second static areas are combined to create a multiplicity of composite pages of user data for call by users with a browser program and for display on the display screen. The user observing the screen receives the perception of a dynamic information display while preserving the navigational or location context of the data being viewed.

40 Claims, 12 Drawing Sheets

METHOD AND APPARATUS FOR CREATING THE APPEARANCE OF MULTIPLE EMBEDDED PAGES OF INFORMATION IN A SINGLE WEB BROWSER DISPLAY

BACKGROUND OF THE INVENTION

1. Field of the Invention

The present invention relates to a method of and apparatus for creating the appearance of multiple embedded pages of information or data in a display, and more particularly to a method and apparatus for generating the perception in the mind of a person viewing multiple pages of data in a network or Web display under control of a "browser" program.

2. Description of Related Art

When a document is viewed on a display screen, it is conventional that consecutive pages of the document are serially displayed. When documents are thus displayed, it is difficult to visualize the structure of the document. Links are conventionally formed between consecutive pages of the document so that the viewer can move to previous and subsequent pages. For example, in the 'prior art' examples of FIG. 1, a browser or viewer window 10 allows scrolling of pages of text (source material 11) serially through the window 10. In this drawing, a continuous strip of source material 11, moves upwardly (giving the perception of moving the browser window 10 downwardly, as shown by the arrow 12) to view consecutive pages of text. The drawback is that what the user sees are pages in sequential order.

In FIG. 2A, the content of the same strip 11 of source material can be hidden by "folding up" the content of the numbered pages Pg. 1,2 & 3. The perception is then of seeing an abbreviated or folded up version 11a of the continuous strip 11 of source material through the viewer or browser display window 10. Microsoft Corporation's "Word" word processor has an outline function which operates in this manner as does the installation documentation displays for Netscape Communications' internet server product which operates in much the same manner on the Web. Links between the pages will allow expansion of selected pages merely by selecting an icon (for example a closed book) which allows opening the selected page, such as Pg. 1, in FIG. 2C. This allows for an improved viewer overall document perception, by expanding a part of the outline, but only allows for seeing a single page at a time while giving an illusion of improved textual navigation and one page decompression at a time. The problem is that the source material still must be sequential.

Web browser programs allow for bringing up a static page and then another etc. using HTTP (Hypertext File Transfer Protocol). This protocol has one machine establishing contact with another and then downloading of a file or files to the browser program.

In hypertext (specialized structuring of a document or documents), it is difficult for the user to maintain the viewing or navigation context. The users visual perception is that of jumping around in the text because of the lack of connection between the topical links formed. However, the difficulty is because the medium does not allow the user or viewer to maintain his place easily. The act of taking the viewer to another location is inherently disruptive.

For example, in a printed, paper book, the user may maintain contextual continuity or navigational ease by putting his fingers in the pages he wishes to turn to, and flip back and forth between those pages without losing context. There is no requirement that the pages he wishes to view are consecutive. There is no such accommodation in computer media today. The viewer of a document or documents on a display needs the convenience of being able to turn to another place or page without losing context or his present place. Before the present invention, this was not possible nor the accommodation available.

SUMMARY OF THE INVENTION

In view of the above it is a principal object of the present invention to provide a method and apparatus for the creation and use of preferentially linked pages of at least one document on a display screen adapted for Web or network viewing of data utilizing a conventional browser program.

Another object of the present Invention is the creation of a pages of a document with a portion of a plurality of pages each having substantially fixed content. Each of such pages also having a window-like portion with the capability of receiving, variable, not necessarily sequential, content. Thus there is a contextual framework with a variable data content which permits the display viewer to proceed through pages of the document while providing a visual link there between.

Still another object of the present invention is to provide a method for creating the perception of a dynamic information display while preserving the viewers navigational or location context. In this connection, the inventive method permits of the linking of substantially (1) unlimited information; (2) maintenance of the viewing or navigation context; (3) the provision of increased flexibility in navigation by avoiding the requirement that the subsections have to be arranged sequentially.

The inventive method of displaying multiple, linked pages, at the discretion of the user, of at least one document on a display screen adapted for Web or network viewing of data on the net by a browser program, begins with the step of creating at least one template of substantially static user data defining a predetermined area on a display screen. The template includes a second static area defining a variable data receiving window on the screen and having the capability of receiving requested groupings of data therein. The next step includes choosing a control on said display screen for permitting the user to specify groupings of data (topics) for viewing in the variable window.

The template and the subsections or data groupings may be combined to form composite pages and stored as such. Alternatively, the template and subsections of data may be separately saved and joined together when called for by the user/viewer to form a composite page of data on the screen. In a third embodiment, subsections may be formed on-the-fly from, for example, a database and then a composite page is created for viewing on the display screen.

The apparatus employed by the system of the present invention would of necessity combine several well known tools. For example, a workstation having the ability to prepare documents, e.g., a word processor, an editor etc. and the concomitant ability to store the results are essential to the creation of a template page with substantially static text (which is meant herein to include graphic portions). A second static portion on the template creates a window for receipt of subsections (separate linked files or pages) which may be merged and stored individually with the templates for later recall by the browser program. Other essentials for such a novel system call for a browser program and network linkages to, for example, a network or web, and the ability for remote users to access remote files containing the composite pages created by the novel method of the present invention.

As may be observed from the forgoing, the viewer/user observing the screen receives the perception of a dynamic information display while preserving the navigational or location context of the data being viewed. This permits easier viewing for extended periods of time by the user, and permits the user to more quickly locate and assimilate that information which is necessary for his/her task, assignment, education etc.

Other objects and a more complete understanding of the invention may be had by referring to the following description taken in conjunction with the accompanying drawings in which:

BRIEF DESCRIPTION OF THE DRAWING

FIG. 13 is a flow diagram similar to that shown in FIG. 12 but for creation of composite pages as illustrated schematically in FIG. 8, and.

DESCRIPTION OF THE ILLUSTRATIVE EMBODIMENT

The operating environment in which the present invention is used encompasses a general distributed computing system, wherein general purpose computers, workstations, or personal computers are connected via communication links of various types, in a client-server arrangement. This is done so that programs, data and the like, many in the form of objects, may be made available by and to various users on the system.

Figure 1A:
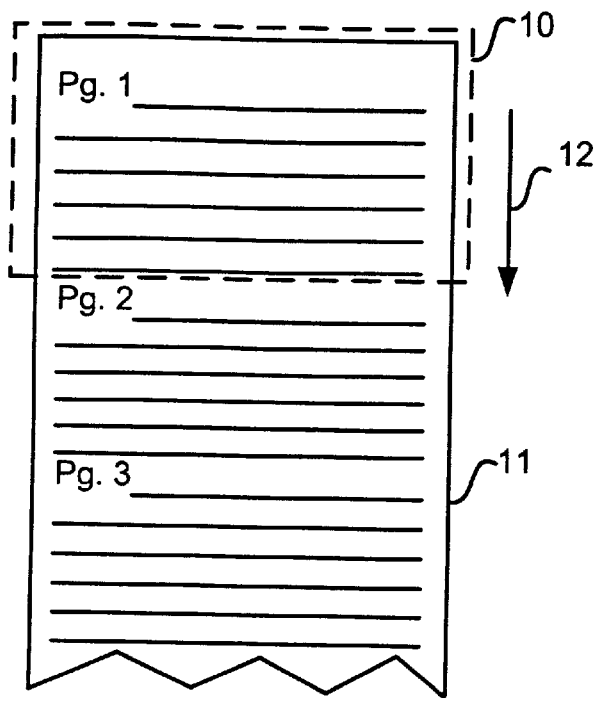
FIG. 1A is a schematic representation of a prior art method of viewing, on a display screen, a multiple page document.
Figure 1B:
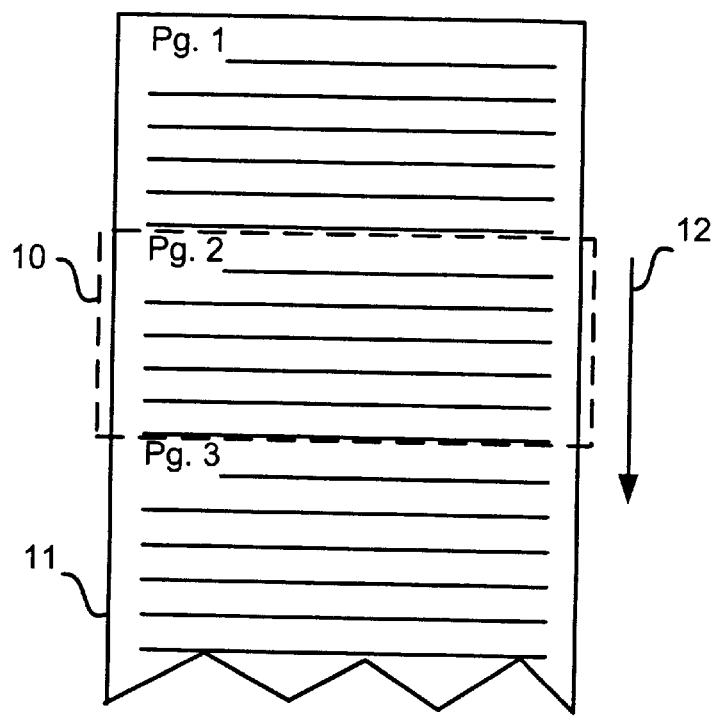
FIG. 1B is a representation, similar to FIG. 1A but showing another page of the document.
Figure 2A:
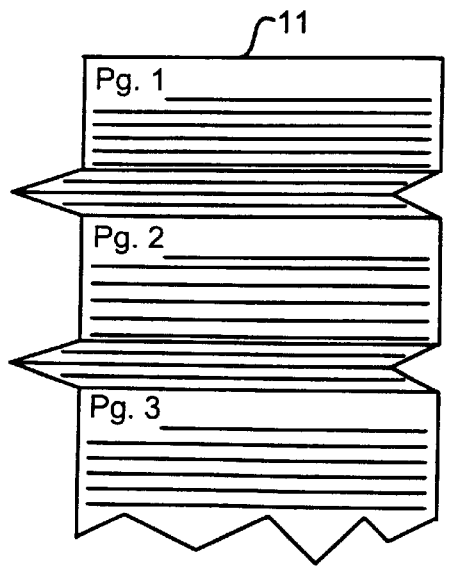
FIG. 2A is another prior art representation of the document illustrated in FIGS. 1A and 1B but with the document have the appearance of being folded.
Figure 2B:
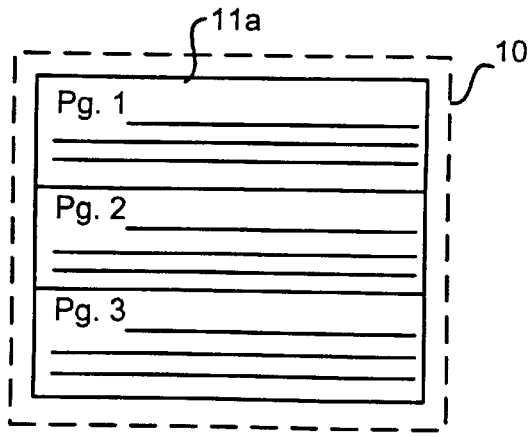
FIG. 2B is a representation of the folded document as seen on a display screen, so that the document appears in an outline form.
Figure 2C:
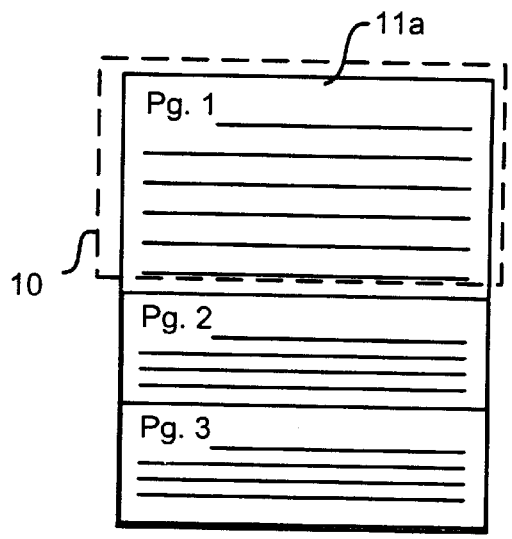
FIG. 2C is a another representation of the folded document illustrated in FIGS. 2A and 2B but with a portion of the document unfolded or expanded for viewing on the display screen.
Figure 3:
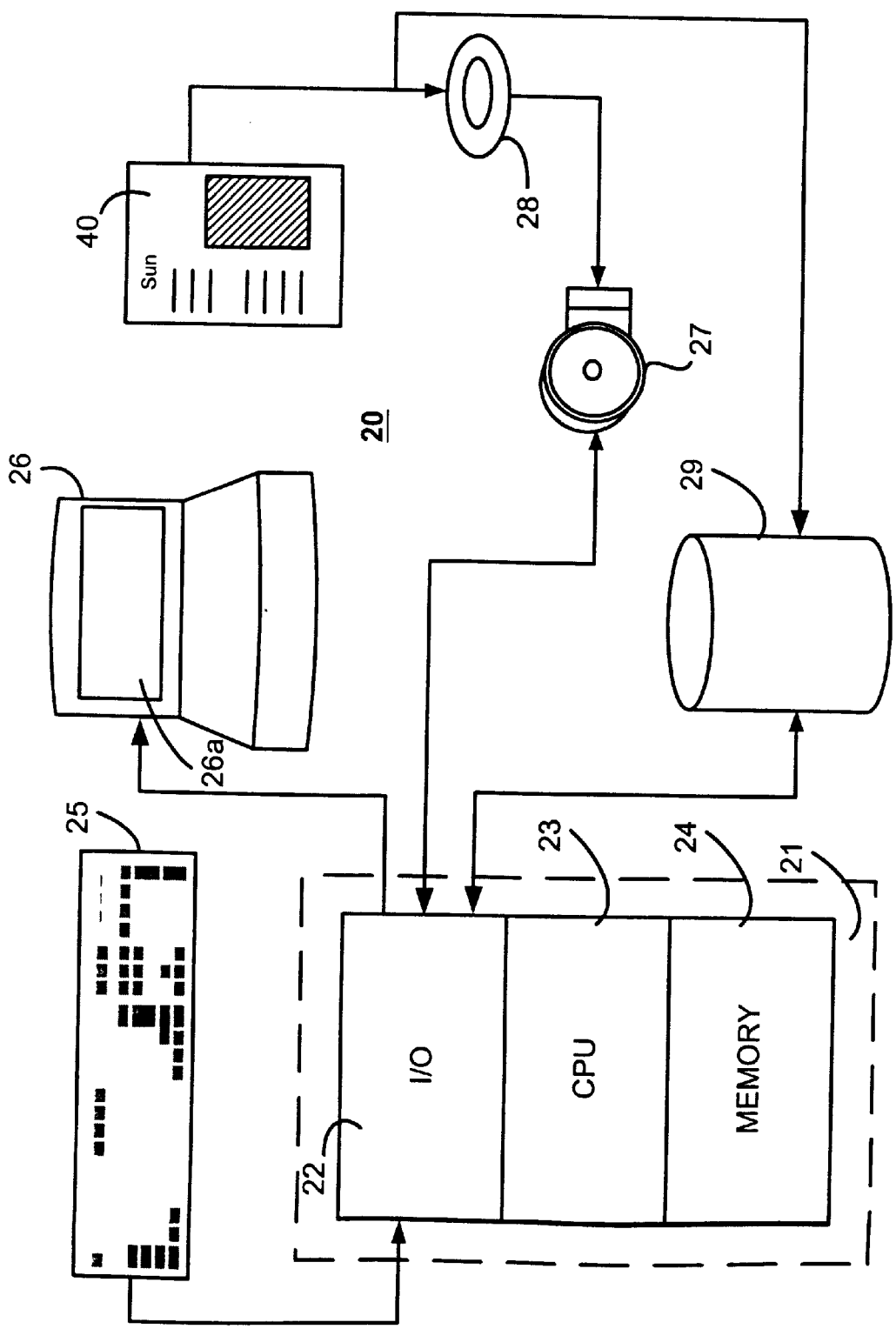
FIG. 3 is a data processing system which provides the operative elements to perform the logical operations of the invention.

Some of the elements of a data processing general purpose workstation computer 20 are illustrated in FIG. 3, wherein a processor 21 is shown, having an input/output (I/O) section 22, a central processing unit (CPU) 23 and a memory section 24. The I/O section 22 is connected to a keyboard 25, a display or monitor 26, a disk storage unit 29, and a CD-ROM or optical disk drive unit 27. The CD-ROM unit 27 can read/write a CD-ROM medium 28 which typically contains programs and data. The computer program products which may be employed for carrying out the methods and apparatus of the present invention, may reside in the memory section 24, on disk storage unit 29 or on the CD-ROM 28 of such a system. Examples of such systems include SPARC™ systems offered by Sun MICROSYSTEMS, Inc., personal computers offered by IBM Corporation and by other manufacturers of IBM-compatible personal computers, and systems running the UNIX or other operating system.

Figure 4:
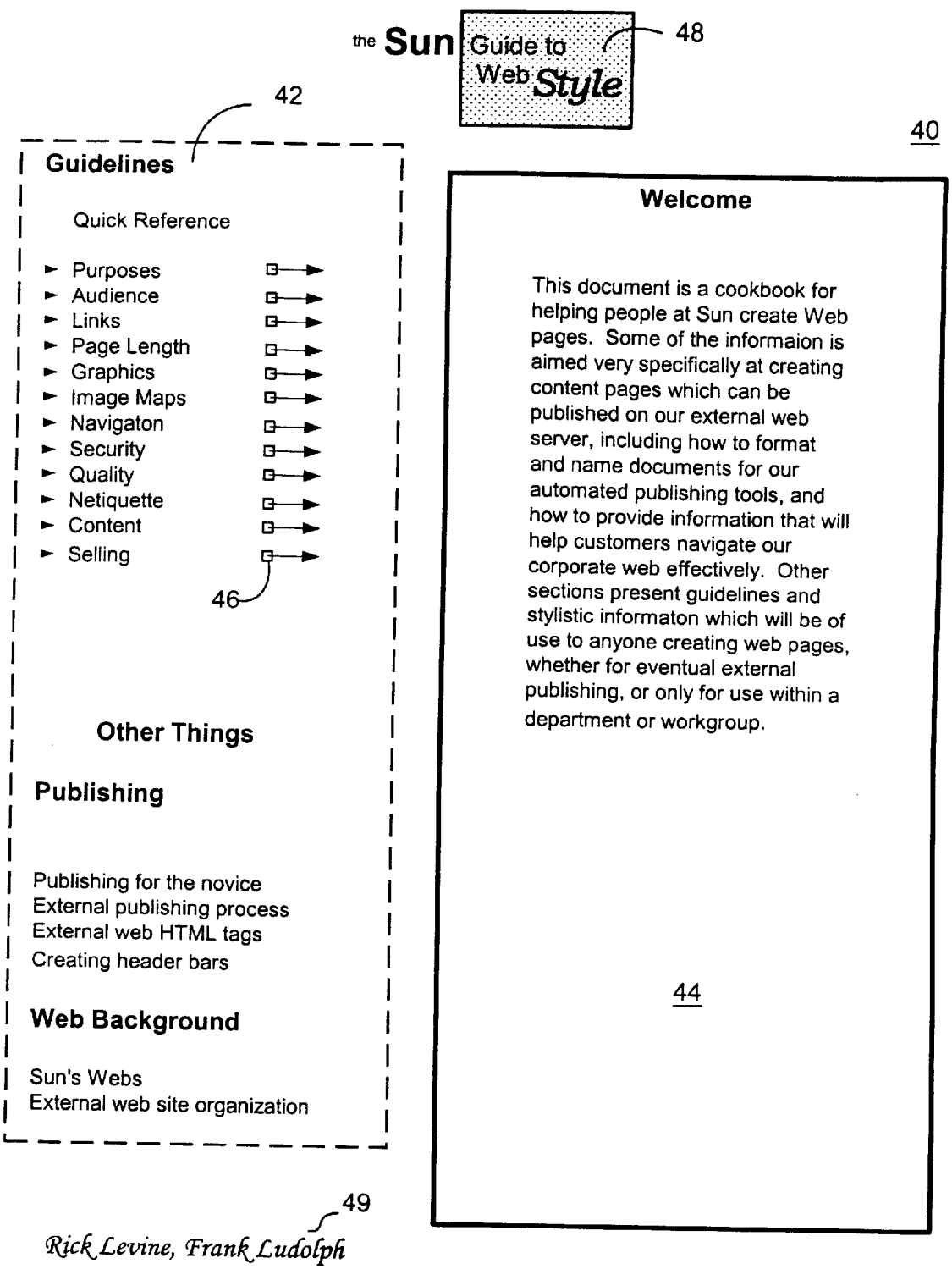
FIG. 4 is an example of a page of a document created in accordance with the present invention.

Referring now to FIG. 4, an example page 40, created in accordance with the present invention, is illustrated therein. The page 40 is preferably intended to fill a major portion of the screen 26a of a display such as the display 26 in FIG. 3. While the page 40 could be smaller, it is preferably not larger than the display area. In the present instance, the page 40 comprises a first fixed area 42 (as shown within the light dashed lines) containing substantially static or fixed data, and a second fixed area 44 defining a window and containing subsections of variable data which may be changed by the viewer/user as by selection of controls or icons (e.g. the arrowheads 46) in a conventional manner well known in the art.

As shown, the page 40 may include a header portion 48, and a footer portion 49 although such is not essential to the invention. Moreover, while the page may contain any number of fixed data items in the area 42, the data selection made in the example page fixed area is designed to aid in user/viewer navigation, and maintain contextual continuity with and for the subsection variable data which appears in the second area or window 44. As will become more evident hereinafter, to preserve the illusion or perception of a static page of data with areas in which the data changes, the static area data should provide a structural or navigational framework for the variable subsections of data in the window 44. Moreover, the subsections of data within the window 44 are capable of being changed as directed by the viewer/user.

As shown in the example, the topical sections under "Guidelines" provide a navigational framework for proceeding through the "Style Guide" for the web. For example the topics which may be selected by the viewer/user not only include a "Quick Reference" to "Guidelines", but other topics such as "Purposes", "Audience", "Links", "Page Length", "Graphics", "Image Maps", "Navigation", "Security", "Quality", "Netiquette" (courtesy on the net), "Content", "Selling" etc. Under the heading of "Other Things" are general topics of interest which may be selected merely by clicking on them (as is conventionally provided in the operator interface with most modern operating systems).

Preparation of the page 40 may be accomplished employing any convenient editor or appropriate word processor which allows some command code in conjunction with the data for proper operation on the net or web by a standard browser program. In essence, and as will be recognized hereinafter, the page 40 forms a template with a first area containing substantially static information, and a second area forming a window for containing variable data as selected by the viewer/user.

In operation, and only by way of example, if the viewer/user selects "Links" on page 40 (FIG. 4), page 50 (FIG. 5) will be displayed on the display monitor 26. It will be noticed that the header 48, footer 49, first fixed area 42 and second fixed area 44 are identical to that shown in FIG. 4. It also should be noticed that the fixed data has not changed in the first area 42 but that the data in the second fixed area 44 has changed to include a new subsection of data entitled: "Overview of Links Guidelines". Note also that each of the "rules" 52–55 is capable of expansion by selecting ("clicking on") a control icon 51, and that rationalization of the fixed or static data has caused an alteration in the control icons from arrowheads 46 to rectangles 46a, except for the selected "Links" control which remains an arrowhead. Of course with a color display, the arrow head color could be changed for the selected subsection of data. This aids in showing that there is a level change in the subsection data in the window 44 while still maintaining navigational, locational and contextual continuity.

Figure 6:
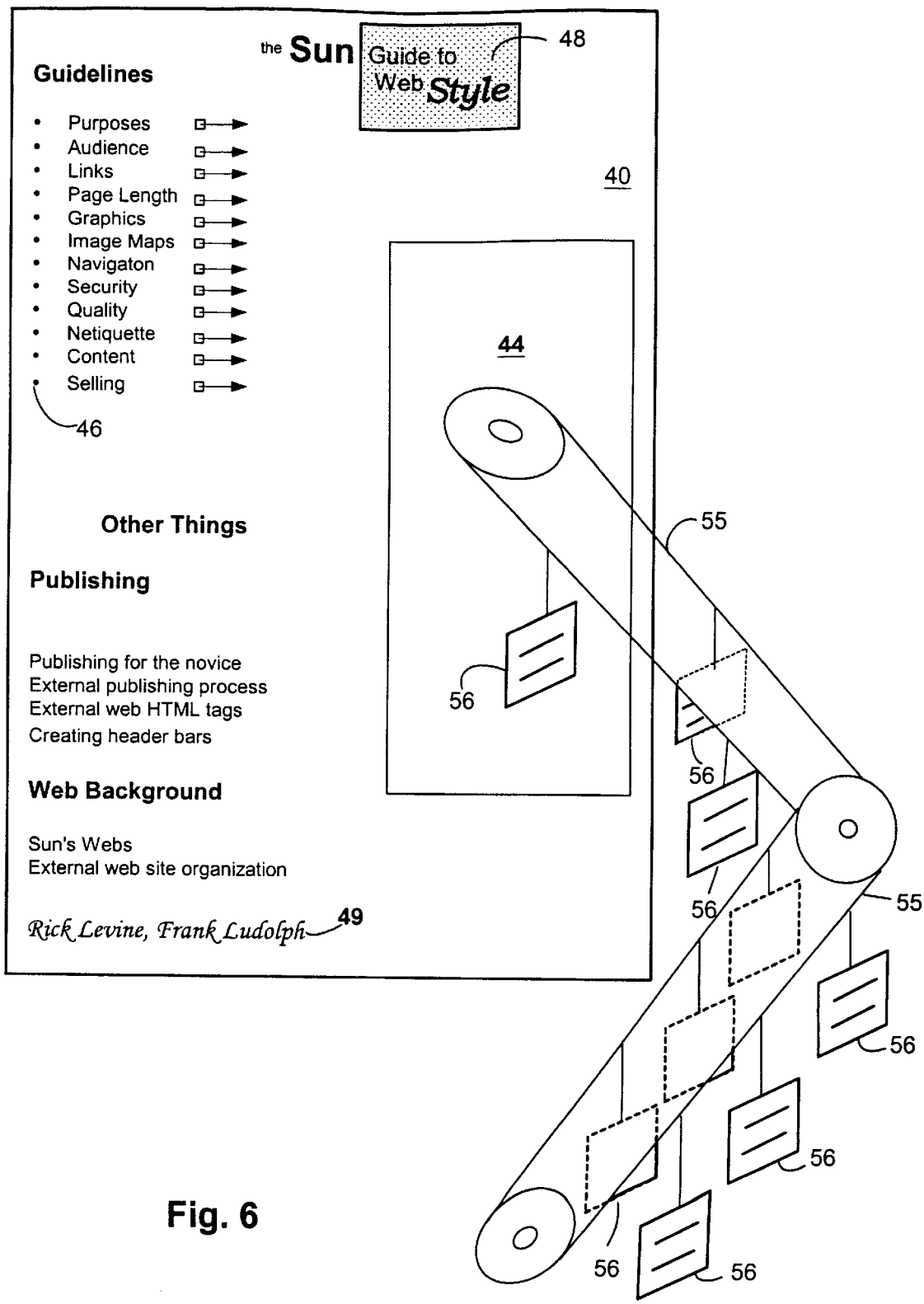
FIG. 6 is a conceptual drawing illustrating how the perception of a dynamic information display is formed in the document while preserving the location and navigational context of the viewer in moving through the document.

FIG. 6 is a conceptual diagram illustrating the viewer/user's perception of how the present invention functions. More particularly FIG. 6 illustrates how the perception of a dynamic information display is formed in the document and viewed on the display screen 26a while preserving the location and navigational context of the viewer in moving through the document. To this end, the second area or window 44 of the page 40 "appears" to have a carousel or conveyor 55 rotating therethrough. The appearance is that the conveyor carries a plurality of data carrying subsections or pages of information which fit into the window 44. The selection by the viewer/user allows one of the subsections 56 to appear in the window 44, or that the entire page 40 is replaced, each time with a new composite page incorporating the new, selected subsections of data for window 44.

Figure 10:
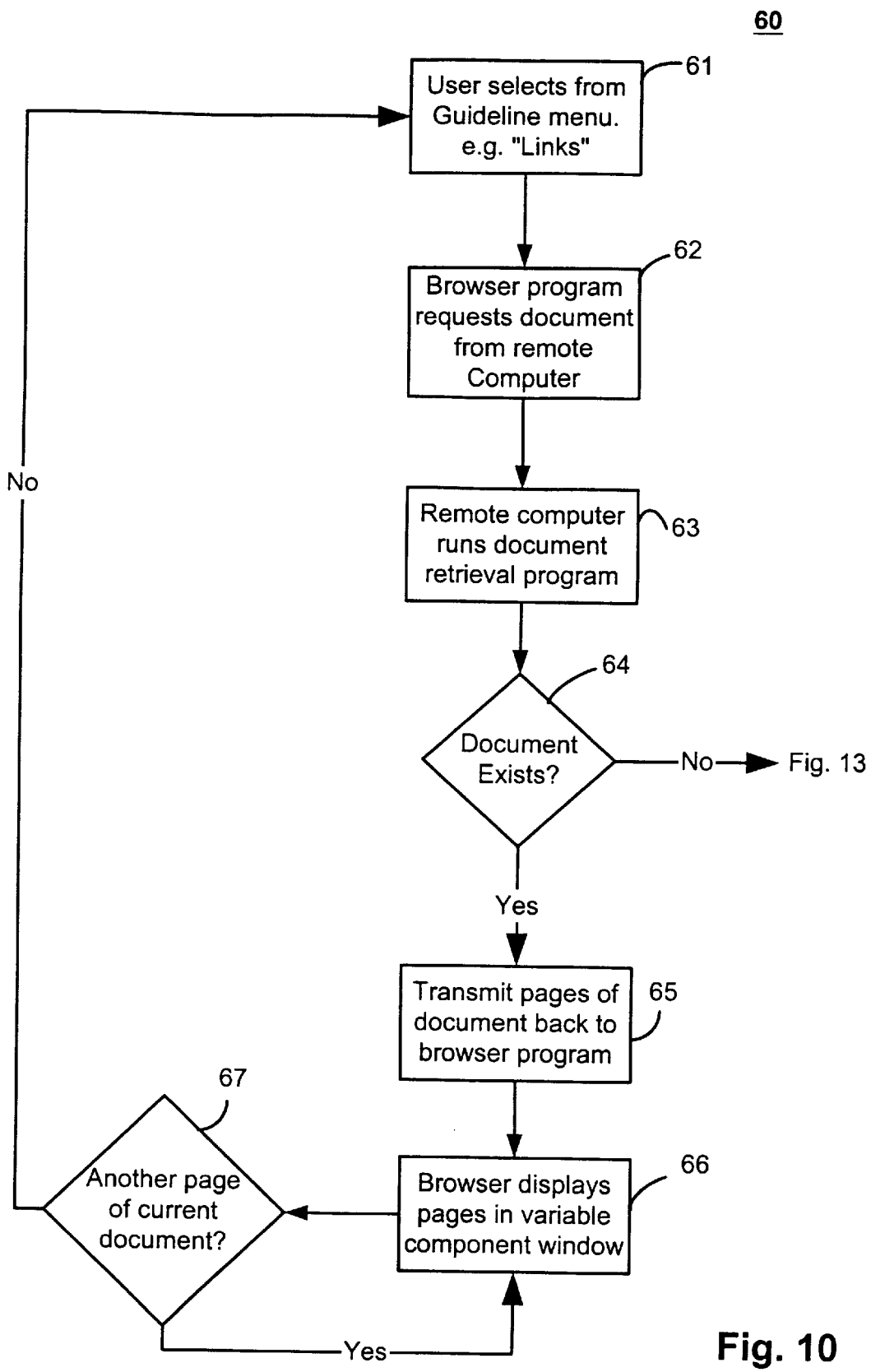
FIG. 10 is a flow diagram illustrating the manner in which a typical browser program works to bring a page of a document to the display screen.

In order to better understand how the perception of multiple imbedded pages of information is created in a browser display, it is necessary that the operation of a web browser program is understood. In this connection, assume that the computer system or data processing system 20 shown in FIG. 3 is connected to the net or web, a browser program is being run on the system, and the viewer/user has page 40 already on the display screen (he/she wanted to know how to prepare documents for the web, and has made that initial selection in a conventional manner). Assume further, that the required information is located on the web or net at a remote computer system, substantially similar to the system heretofore described relative to FIG. 3. With that background, FIG. 10 shows a high level flow diagram 60 of how a typical browser program works. As shown in the first step 61, the viewer/user will select, by clicking on a suitable control on the "Guidelines" menu, for example "Links". In response to that command and as shown in step 62, the browser program then requests the document from the remote computer, and the remote computer then runs its own document retrieval program, as shown in step 63, to retrieve the requested document.

If the requested document exists, as shown in the decision step 64, the document will be transmitted back, as in step 65, to the browser program associated with the viewer/user, for display on the monitor 26. The browser program will then display, as shown in step 66, under control of the viewer/user, called for pages of the document, which from appearance will alter the subsections of data in the variable component window 44. A decision that there is another page selection by the viewer/user as in decision logical step 67 will cause another page to be displayed, once again apparently as if the only new information is contained in the window 44. If the answer to the logical question in step 67 is "no", then the program will loop back to step 61 and allow for subsequent selections from the "Guidelines" menu.

In the event that there is no requested document (as determined in decision step 64), conventionally an error message will appear indicating that the request cannot be fulfilled because the document cannot be found. While this type of error message is still available, depending upon the implementation of the present invention, it may be possible, as will be more fully explained hereinafter, to create the desired document from existing, remotely available data.

One of the major shortcomings of existing browser programs is the inability to bring into the display, e.g. the display 26, a window for receipt of variable information. In other words, with existing browser programs, the entire page must be replaced at a time. Therefore, it is necessary, with the present invention, to bring in entire pages at a time, and give the viewer/user the perception that what is being brought in is just linked subsections of data in the viewer window.

Figure 7:
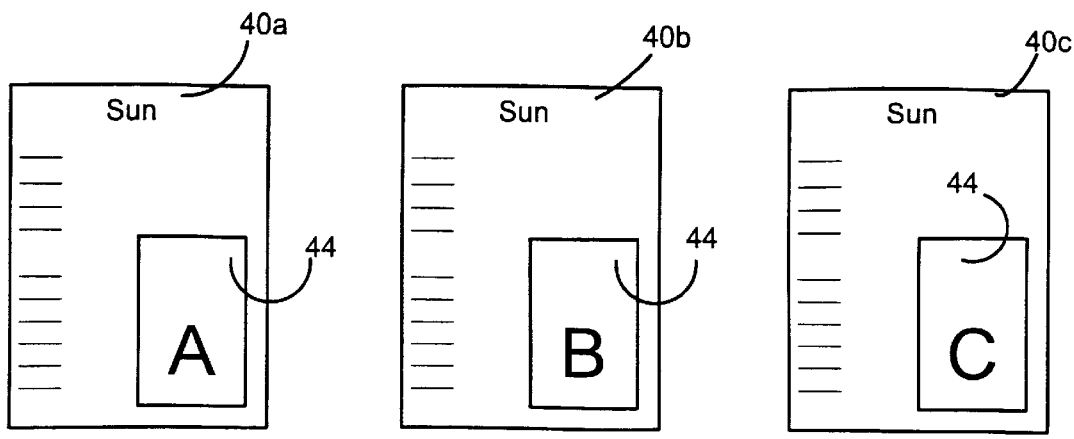
FIG. 7 is a schematic illustration of the manner in which a page, created in accordance with the present invention, may be formed.

To this end, and referring now to FIG. 7, pages 40a, 40b and 40c are shown, each page differing from the other only because of different subsections of data "A", "B" or "C" shown in the window 44 of the respective pages 40a–40c. (Note that these subsections of data may be in any order, not necessarily sequential). It should be noted that the remainder of each document contains substantially the same data, any minor differences only being created by rationalization between the variable subsections of data, e.g. "A", "B" or "C", and the data contained in each of the first fixed areas of each of the documents. (See, for example, FIGS. 4 and 5 for the minor differences of the information contained in the first fixed area 42 between pages 40 and 50).

Figure 11:
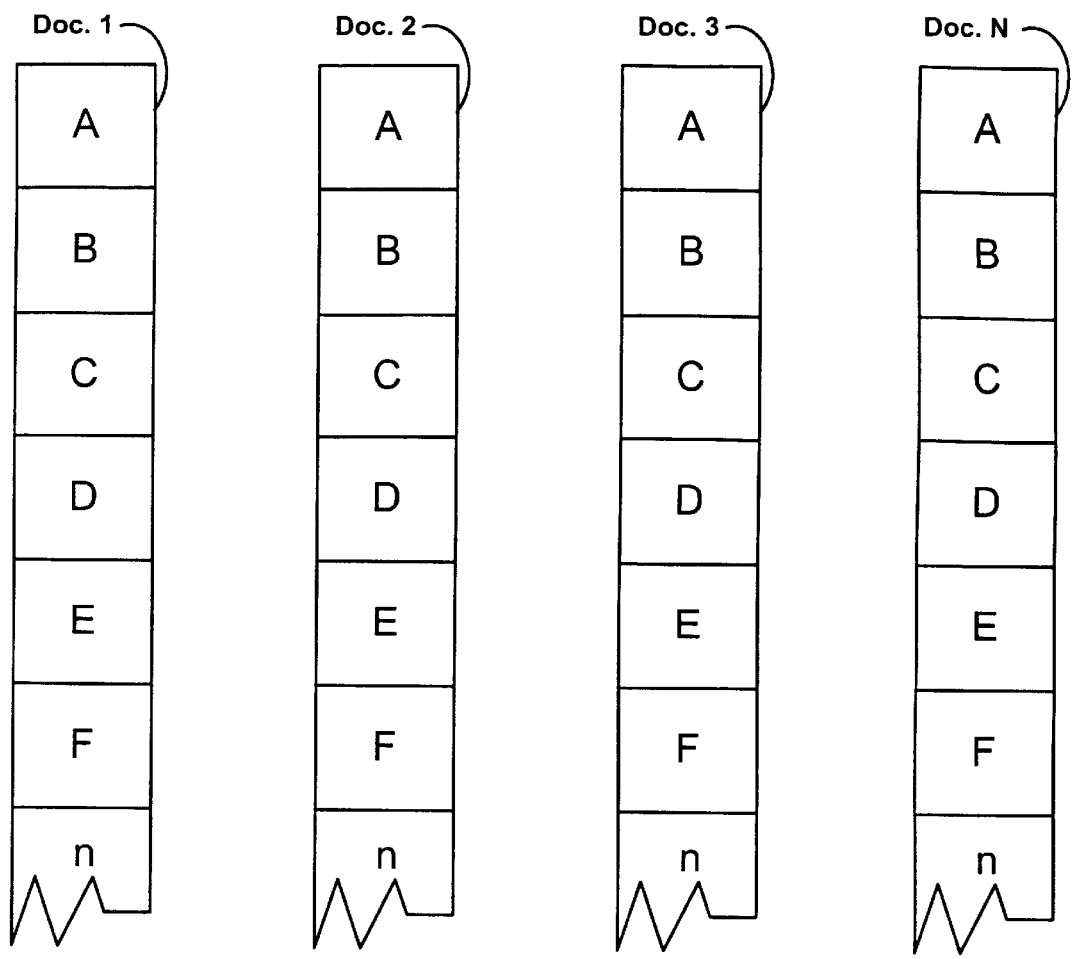
FIG. 11 illustrates a plurality of documents formed of linked files for use in creating composite pages for viewing by a user at a video display.
Figure 12:
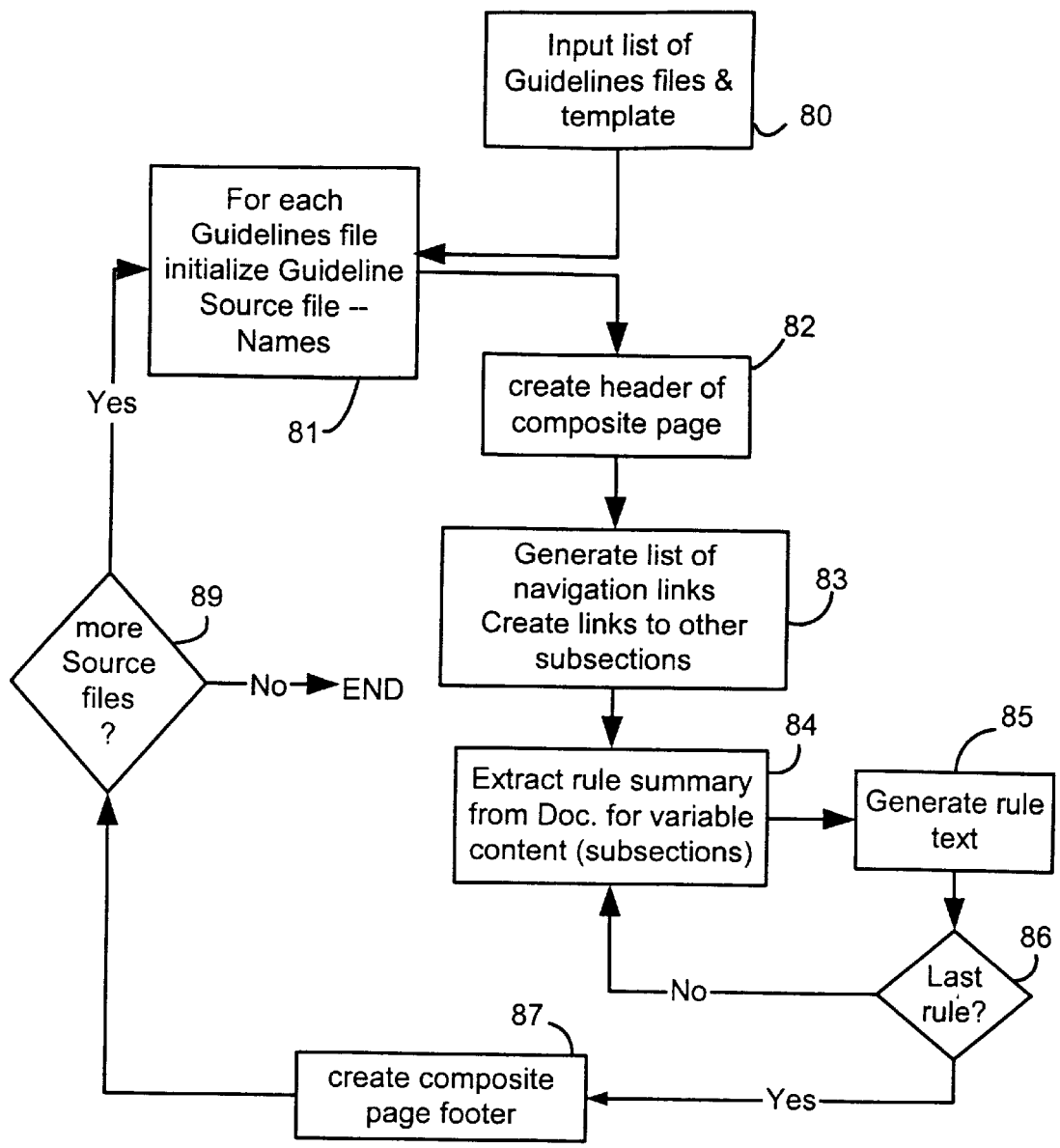
FIG. 12 is a flow diagram illustrating the creation of composite pages as shown in FIG. 7 and formed of the documents illustrated in FIG. 11 and a template.

In essence, and as will be more fully explained in the logical program operation shown in FIGS. 11–12, a template page 40 is first created in a manner such as explained heretofore, and then merged with individual pages or subsections of data, e.g. "A", "B" or "C", and then the composite pages are saved or stored (for example by the optical drive 27 or disk storage unit 29) for recall as part of the document when the document is remotely requested.

Figure 8:
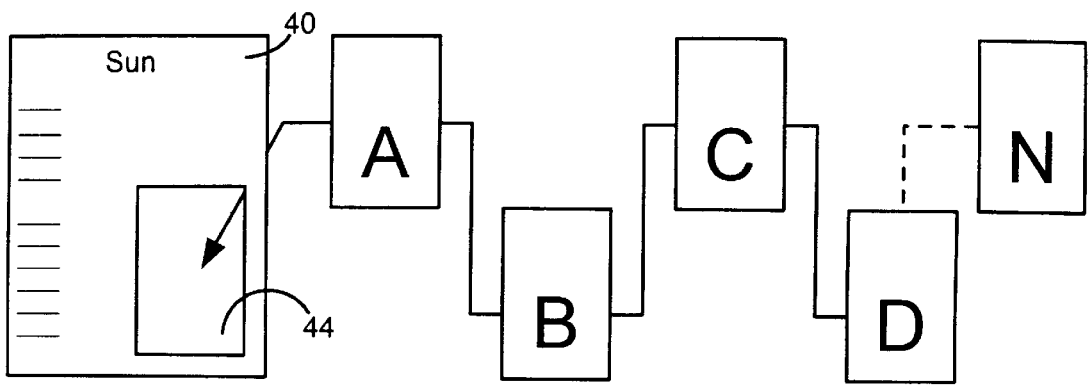
FIG. 8 is another schematic illustration of the manner in which a page created in accordance with the present invention may be formed.

In another embodiment of the invention, and referring now to FIG. 8, the template document or page 40 is merged with linked subsections of data "A", "B", "C", "D" . . . "N" in any order, not necessarily sequential, when called for by the user/viewer. In other words, the composite page is formed, including the substantially fixed data or information in the first fixed area, when it is merged on the fly with each one of subsections of data "A" . . . "N" when called by the user/viewer. How this is accomplished will be described hereinafter with respect to FIG. 13.

Figure 9:
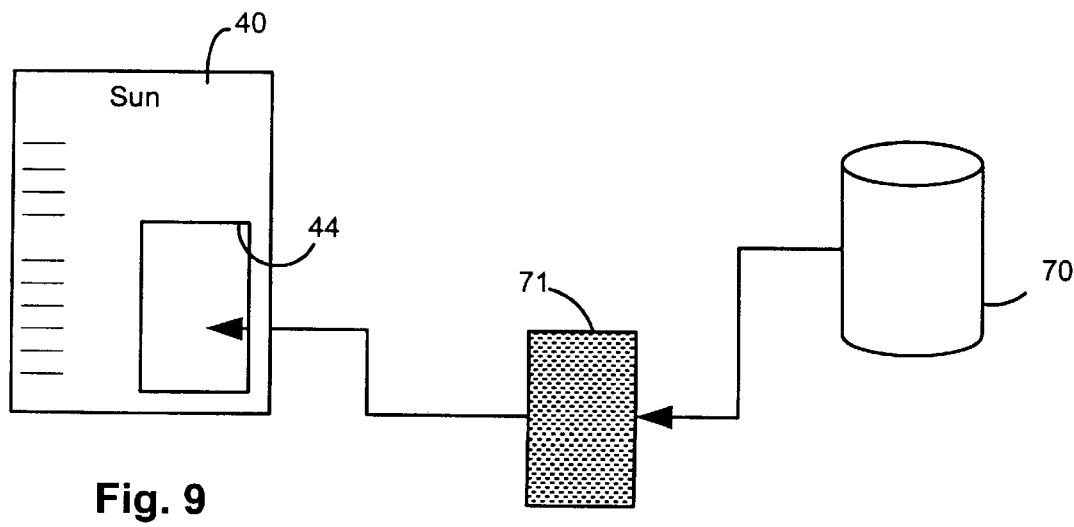
FIG. 9 is yet another schematic illustration of the manner in which a page created in accordance with the present invention may be formed.

In a third embodiment of the invention, and referring now to FIG. 9, a database 70 is illustrated as containing the information required by the user/viewer. By the link being contained in the query to the database, the subsections 71 are truly formed on the fly and merged with the document 40 in the window 44 for transmission to the user/viewer. How this is accomplished will be described hereinafter with respect to FIG. 14.

Referring now to FIG. 11, and assuming that the template 40 has been saved as a separate file, the subsections of data relating to each topic, (in the example "Guidelines" menu, e.g. "Purposes", Audience", "Links" etc.) may be saved as linked, separate files or documents. For example, the files or subsections of data "A" . . . "n" shown in FIG. 11 and designated Doc. 1 may relate to the topic "Links" in the Guidelines menu (FIG. 4) while the Doc. 2, may relate to "Audience"; Doc. 3 to "Graphics" etc. Moreover, certain files in one Doc. may be duplicates of files in another topical heading list of files, or there may exist cross linkages or even further sub-subsection linkages to other files.

With regard to the method described heretofore with respect to FIG. 7, and referring now to FIG. 12, the first step in generating composite pages is to input into memory, such as the memory 24, a list of, for example, topically associated source files, such as the "Guideline" files plus the file containing the template page 40. In the present instance, all of the files "A" . . . "n" associated with Doc.'s 1–N would be entered. (See logical step 80 in FIG. 12). At that time, and for purposes which will become self evident hereinafter, all of the listed "Guideline" files entered would be initialized or opened, as shown in step 81 (usually by name). If the header is to be changed or altered from that shown on the template 40, or if the template called up or saved does not contain a header, then one is generated for the composite document as shown in logic step 82. In order to create a navigational linkage for the user/viewer, the creator of the composite document pages must generate a navigation link list to provide choices for the user/viewer. Moreover, if the creator of the composite pages wishes to link to other subsections, he may do so by adding those subsections appropriately to the list. It should be understood that logical links may be based upon anything. For example, "next", "previous", "first", "last", and rationalization of the composite pages should reflect this list of links. Thus while the static portion of the composite page will appear to be static, i.e. the same, the actual content of the program pointers must be changed for each of the composites pages to select the conditions added. (I.e. "next", "previous", "first", "last"). This logical step or steps is depicted in FIG. 12, step 83.

In order to facilitate navigation by the user/viewer through the composite pages, a brief "rule" summary or abstract may be extracted from each of the initialized files in the topical, initialized source files. In the illustrated instance, logical step 84, each file "A" . . . "n" is read for a rule or summary of the file content. (When the file is prepared initially, this may be the topic sentence, the meaningful title etc.) For example, the subsection text shown in FIG. 5, and labeled "Overview of Links Guidelines" contains the rule summaries for the subject "Links". Moreover, all of the desired text may be then added as a subsection. This is shown as step 85 in FIG. 12. A decision is then made in logical step 86 to determine if this was the last rule extracted, including text. If it was not, then logical step 84 is looped to and the loop continues until there are no further rule summaries (and therefor no further rule texts).

Figure 5:
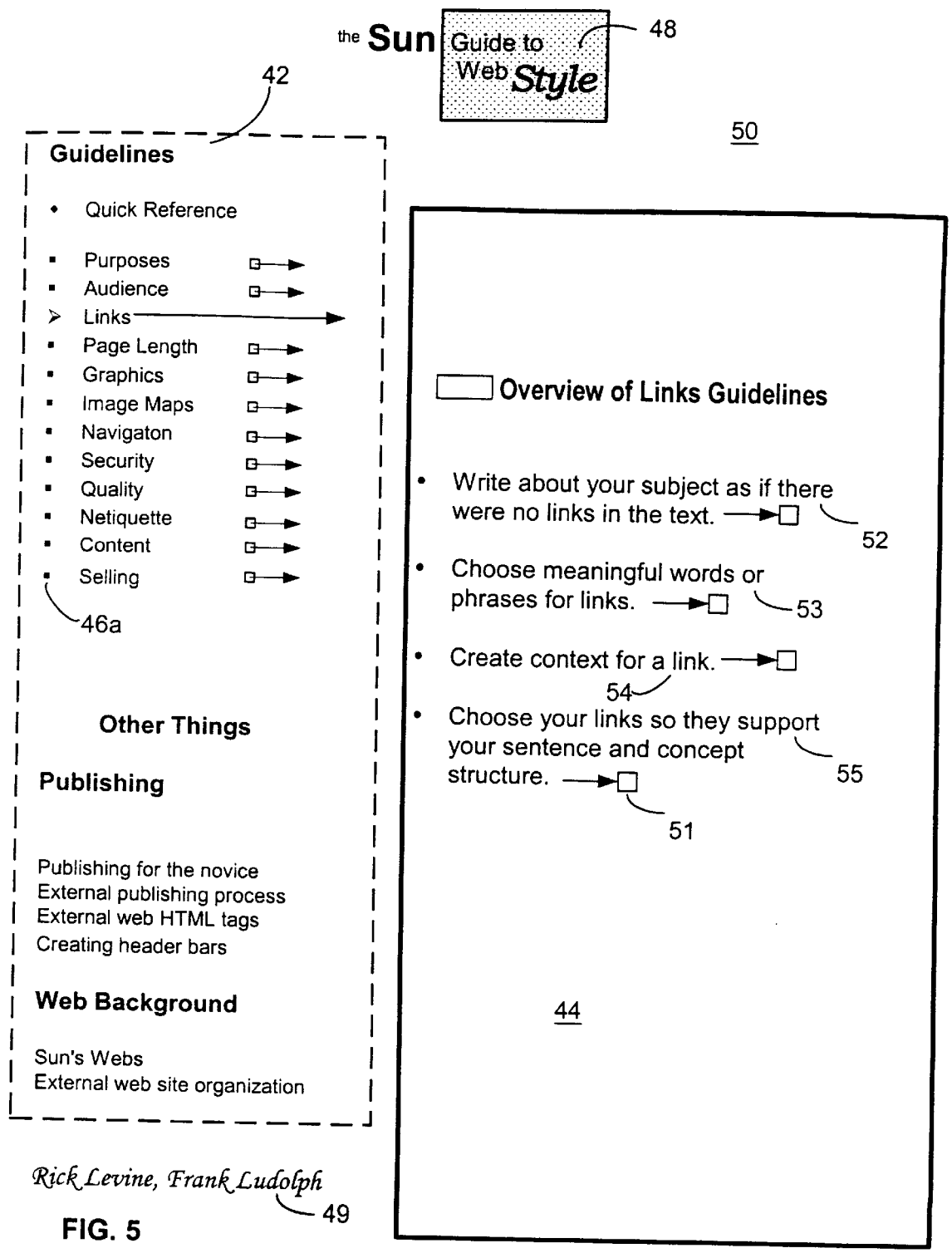
FIG. 5 depicts another page of the document with portions thereof modified in accordance with the present invention from that shown in FIG. 4 but which gives the viewer the perception of a dynamic information display while preserving the navigational or location context of the data being viewed.

At that time, and as shown in logical step 87, it may be convenient (if not already contained in the template page) to create the composite page footer, such as the footer 49 in FIGS. 4 & 5. This footer may contain the signatures and date/time of preparation of the page etc. Moreover, if there are a great many pages of rule text to be created, it may be helpful to insert logic step 87 intermediate logic steps 85 and 86. Suffice that the composite page, as it is completed, is saved by either or both of the drives 27, 29. If there are no more "Guideline" source files, then this program ends. If there are, then the decision logic 88 continues by looping back to logic step 81.

Figure 13:
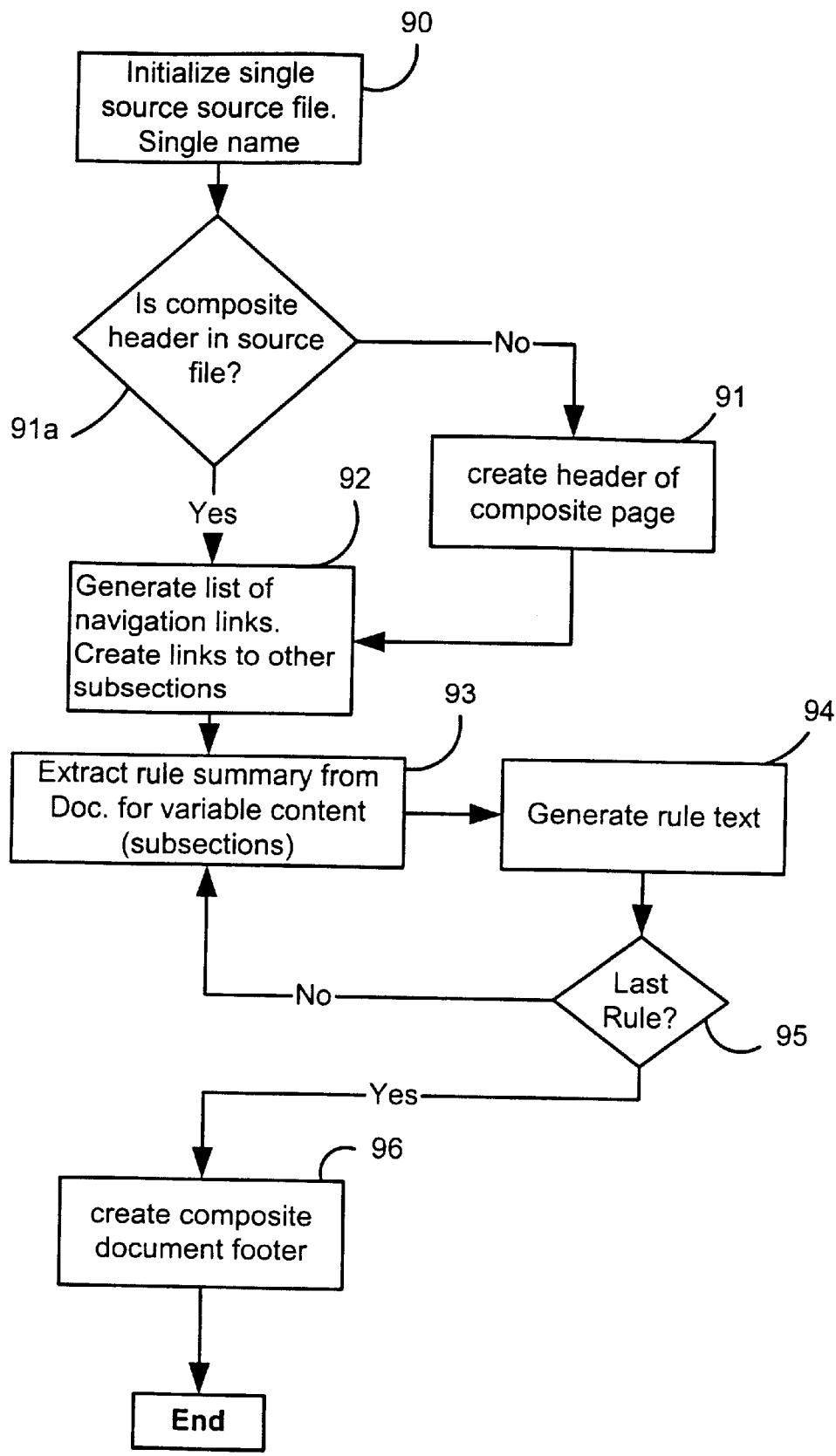

In FIG. 13, the composite page is created "on-the-fly", as described briefly heretofore with respect to FIG. 8. In this connection, the program initializes the template page and only a single source file (e.g. Doc. 1) and after extracting the rule summaries for a first composite document, presents the rule text to a composite page requested by the user/viewer. This is handled by logical step 90, initialize single source file; step 91, create the header for the composite page unless the header is in the source file for the template as determined in logical decision step 91a; step 93, generate list of navigation links through the topic as well as create links to other desired subsections; extract rule summaries from the files associated with Doc. 1; step 94, generate the rule text; step 95, test for completion of rule summaries; step 96 if not in the template, create composite page footer.

Figure 14:
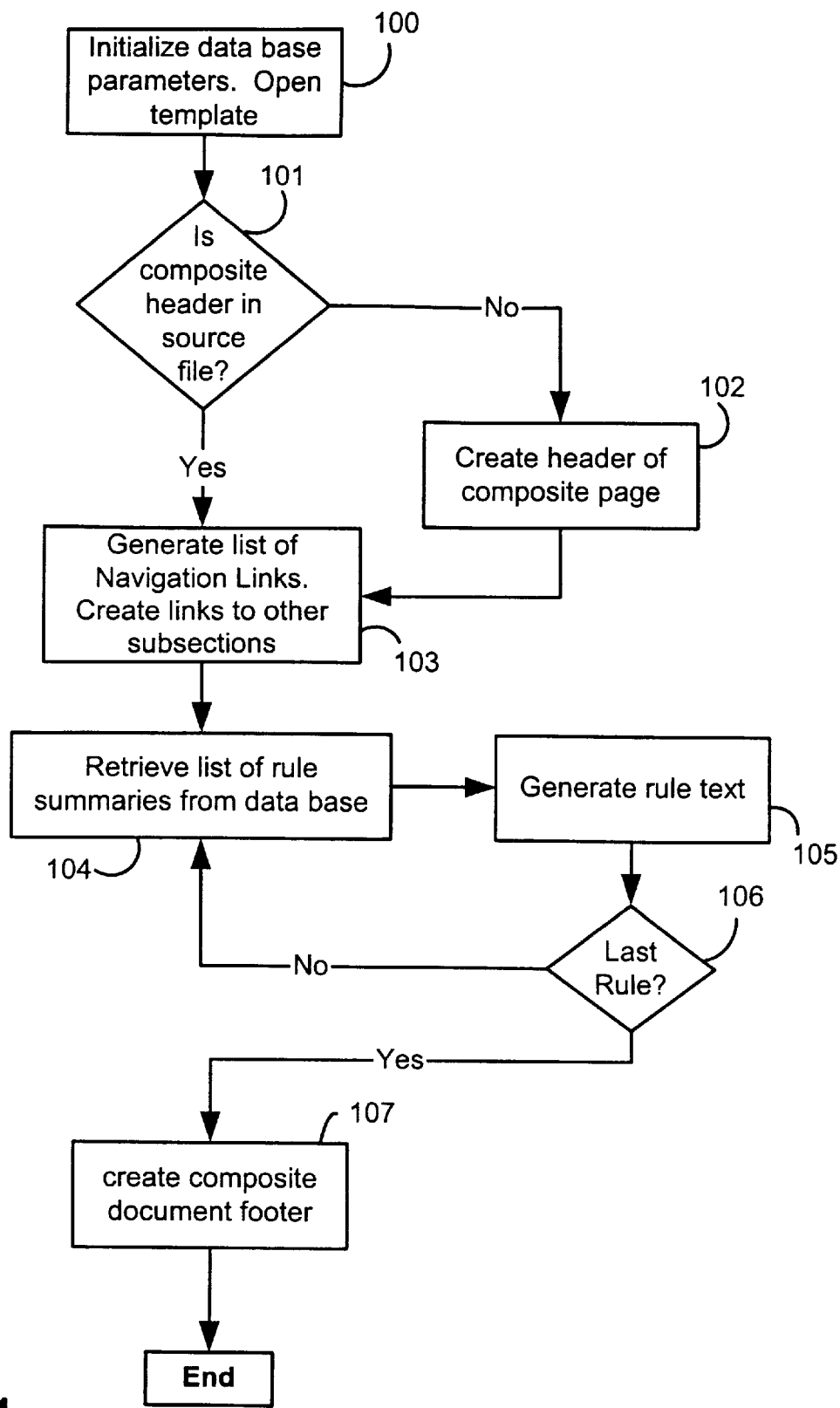
FIG. 14 is a flow diagram similar to FIG. 13 but for creation of composite pages as illustrated by the technique shown in FIG. 9.

In FIG. 14, which reflects the program steps for the third embodiment shown in FIG. 9, the program derives the subsections from a data base, such as the data base 70 shown in FIG. 9, and sends the variable information to the browser program in combination with the template to form the composite page.

The first and most critical step in the program illustrated in FIG. 14 is step 100, i.e. initialize data base parameters. Otherwise the remainder of the program is quite similar to that described with reference to FIG. 13.

The initialization of the data base parameters may be accomplished by an appropriate search query. Initialization is really by a category of rules, e.g., page length, graphics etc. and what will be retrieved from the data base will be accomplished by a the entry of an appropriate search string. The data base data itself has rules, each of which contains a (1) rule summary (2) body text. There are key words for each data grouping. Sorting in the database would be by query on, for example: graphics, color, performance; sort by: relevance; limit: 100 items. Depending upon the command set, a possible command string would be:

DATABASE:RETRIEVE?KEYS=GRAPHICS, COLOR, PERFORMANCE; SORT=RELEVANCE: LIMIT=100.

After the data base is initialized as above, and the template is also opened, the first decision at step 101 is whether the composite header is in the source file. If not, create the header of the composite page at step 102. If it is, just as in the programs of FIGS. 12 and 13, and at step 103, a list of navigation links is created, as well as creating links to other subsections of data. At program step 104, the list of rule summaries is created and at 105 the text of each rule summary is generated. The program then loops as at program step 106 until all of the text associated with each rule summary has been generated. At program step 107, if no footer has been created in the template, then it is created for each composite page.

Thus the method and apparatus for creating pages of information creates the perception of a dynamic information display while preserving the viewers navigational or location context. In this connection, the inventive method permits of (1) the linking of substantially unlimited information; (2) maintenance of the viewing or navigational context of the information being viewed, and; (3) the provision of increased flexibility in navigation by user/viewers on display screens, avoiding the requirement that the subsections of data have to be arranged sequentially.

It will be recognized by one skilled in the art that the program code and data for achieving the novel result, includes well known individual parts, the program code for which may be stored conveniently upon a program disk (e.g. disk 28) to form a computer program product. As is conventional, the program includes a computer usable medium having computer readable code thereon for causing data to be written into at least the memory of a computer system.

The data includes code to permit user preferentially linked pages of at least one multi-paged document to be displayed on a display screen adapted for web or network viewing of selected data on the net by a browser program.

The first portion of the code permits the user to create at least one template of substantially static user data defining a predetermined area on a display screen, while a second portion of the computer readable code creates a window on the display screen having the capability of receiving a variable but requested grouping of data therein. Still a third computer readable portion of the code creates a control on said static portion of the display screen for permitting the user to specify groupings of data for viewing in the variable window. In this manner when the computer readable program code is loaded into a computer and is operating, the user observing the screen and the data receives the perception of a dynamic information display while preserving the navigational or location context of the data being viewed.

Although the invention has been described with a certain degree of particularity, it should be recognized that elements thereof may be altered by person(s) skilled in the art with out departing from the spirit and scope of the invention as hereinafter set forth in the following claims.

What is claimed is:

1. A method of displaying multiple, user preferentially linked pages of at least one multi-paged document on a display screen adapted for viewing of data, said method comprising the steps of:

creating a template for simulating a windowed-data display within an application program, said template having a first area for displaying substantially static data on said display screen, and a second area for displaying variable data therein; and providing a control on said first area for permitting the user to specify a link to data for viewing in said second area, said control having a visible indicator in the first area indicating when the link has been selected, wherein in response to the user's selection, the selected data is displayed in the second area;

simulating a windowed-data display on said display by displaying said first area and said second area within a single application window of said application program, wherein when the user selects said control, the visible indicator indicates that the data corresponding to said link is being displayed in said second area whereby the user observing the display screen receives the perception of a dynamic information display while preserving the navigational or location context of the data being viewed.

2. The method of claim 1 for displaying multiple, user preferentially linked pages of at least one multi-paged document on a display screen adapted for viewing of data, said method further comprising the steps of:

creating said template of substantially static data on said display screen prior to a request of said data; and creating multiple composite copies formed from said template and a plurality of differing portions of said variable data.

3. The method of claim 2 for displaying multiple, user preferentially linked pages of at least one multi-paged document on a display screen adapted for viewing of data, said method further comprising the step of:

saving said composite copies with links reflected in a composite page, said links linking the order and user selectivity for subsequent composite pages.

4. The method of claim 1 for displaying multiple, user preferentially linked pages of at least one multi-paged document on a display screen adapted for viewing of data, said method further comprising the steps of:

selecting a single template page;

selecting a multiplicity of pages of variable data arranged in linked order preferred by the user; and creating a composite document by merging said template and each page of variable data when called for by the user.

5. The method of claim 4 for displaying multiple, user preferentially linked pages of at least one multi-paged document on a display screen adapted for viewing of data, said method further comprising the step of:

storing said composite pages in linked files.

6. The method of claim 1 for displaying multiple, user preferentially linked pages of at least one multi-paged document on a display screen adapted for viewing of data, said method further comprising the steps of:

initializing a database in accordance with a user selected topic;

creating links to sections of data base information or data in accordance with a data base query by user.

7. The method of claim 6 for displaying multiple, user preferentially linked pages of at least one multi-paged document on a display screen adapted for viewing of data, said method further comprising the steps of:

sorting said linked sections of data base information or data in accordance with user commanded sort order.

8. The method of claim 7 for displaying multiple, user preferentially linked pages of at least one multi-paged document on a display screen adapted for viewing of data, said method further comprising the steps of:

constructing or building a composite dynamic page on the fly; and retrieving successive composite pages by said links at the designation.

9. A method of displaying multiple, user preferentially linked pages of at least one document on a display screen adapted for web or network viewing of pages of data by a browser program, said method comprising the steps of:

creating a template page having a first predetermined substantially static area on a display screen;

creating a second predetermined area on said template page to simulate the appearance of a variable-data window on said display screen within said browser program, said second predetermined area having the capability of receiving a user requested subsection of data therein;

generating a plurality of subsections linked to said template;

providing a user selectable control on said first predetermined area for permitting the user to select specific linked subsections of data for viewing in said second predetermined area on said template page in response to a selection by the user; said control having a visible indicator in said first predetermined area indicating when the specified linked subsection of data is displayed in the second predetermined area; and creating a multiplicity of composite pages comprising said template page and said subsections for call by users with said browser program and for display on said display screen;

displaying said composite pages with a single application window of said browser program to simulate simulating a windowed-data display on said screen; and activating the visible indicator in the first predetermined area when the specified linked subsection of data is displayed in the second predetermined area, whereby the user observing the screen receives the perception of a dynamic information display while preserving the navigational or location context of the data being viewed.

10. The method of claim 9 for displaying multiple, user preferentially linked pages of at least one document on a display screen adapted for web or network viewing of pages of data, said method further comprising the step of:

storing said composite pages for later recall by a user.

11. A method of creating composite pages of static and variable data for receipt on a display screen associated with a display monitor in a networking environment, said method comprising the steps of:

creating a template page having a first area of substantially static data;

creating a second static area within said template page to introduce subsections of variable data;

creating ordered and linked subsections of data;

creating a composite page for viewing in said display screen by merging said template page and said subsections in linked order;

rationalizing said subsections and said template page to permit selection of subsections on said composite page when viewed on said display screen by a viewer/user;

providing a user selectable control in said first area for permitting the user to select specific linked subsections of data for viewing in said second area on said template page in response to the user's selection, said control having a visible indicator in said first area indicating when the specified linked subsection of data is displayed in the second;

simulating a windowed-data display on said display by displaying said first area within at least a single application window; and activating the visible indicator in the first area when the specified linked subsection of data is displayed in the second area, whereby the first area provides a structural or navigational framework to the viewer/user for the second static area and the variable subsections that the viewer/user can direct to be changed.

12. Apparatus for creating composite pages of static and variable data for receipt on a display screen associated with a display monitor in a computing system, the computer system having a processor, memory, input/output section, a keyboard, display monitor and a storage subsystem for storing programs and data therein and an operating system for said computer system, said apparatus comprising:

a template page storage device for storing a template page simulating a window data display of an application program, said template page having a first area of substantially static data and a second area for displaying variable data selected by a user on said page, the static data in said first area providing for a structural or navigational framework to the viewer/user for data contained in said second area;

link controls configured to link a plurality of ordered and linked subsections of data stored in said storage subsystem;

a retrieving device configured to receive said template page and one by one pages of linked subsections of data into said memory and for merging said template and individual ones of said pages of linked subsections into said second static area of said template to thereby create a plurality of composite pages in memory; and a rationalizer configured to rationalize said subsections and said template to permit selection of selected composite documents when called up for viewing on a display by the user.

13. The apparatus of claim 12 for creating composite pages of static and variable data for receipt on a display screen associated with a display, said apparatus further comprising:

a browser control configured to control said retrieving device to create said composite pages.

14. A computer program product including a computer usable medium having computer readable code thereon, said medium for causing data to be written into at least the memory of a computer system, comprising:

computer readable code configured to permit user preferentially linked pages of at least one multi-paged document to be displayed on a display screen adapted for web or network viewing of selected data from a network by a browser program;

computer readable code configured to create at least one template, said template for simulating a windowed-data display within said browser program, said template comprising substantially static user data defining a predetermined area on a display screen;

computer readable code configured to create a window on said screen having the capability of receiving a variable but requested grouping of data therein;

computer readable code configured to create a control on aid static portion of said display screen for permitting the user to specify groupings of data for viewing in said variable window in response to a selection by the user, said control having a visible indicator indicating when the specified data is displayed in said variable window, said visible indicator comprising a directional area;

computer readable code configured to simulate a windowed-data display on said display screen by displaying said static user data and said variable data within at least a single application window, whereby when the computer readable program code is loaded into a computer and is operating, the user observing the screen receives the perception of a dynamic information display while preserving the navigational or location context of the data being viewed.

15. A computer program storage medium readable by a computing system and encoding a program of instructions for executing a computer process for displaying multiple, user preferentially linked pages of at least one multi-paged document on a display screen adapted for web or network viewing of from a network by a browser program, said computer process comprising the steps of:

creating a template for simulating a windowed-data display within said browser program, said template having a first area for displaying substantially static data on said display screen and a second area for displaying variable data there;

providing a control on said static first area for permitting the user to specify data for viewing in said second area in response to the user's selection of data for display, said control having a visible indicator in said static first area indicating when the specified linked subsection of data is displayed in the second area; and simulating a windowed-data display on said display by displaying said first area and said second area within a single application window of said browser program wherein when the user selects said control, the visible indicator indicates that the data corresponding to said link is being displayed in said second area, whereby the user observing the screen receives the perception of a dynamic information display while preserving the navigational or location context of the data being viewed.

16. The computer storage medium of claim 15 wherein said computer process further comprises the steps of:

preparing said template of substantially static user data defining a predetermined area on a display screen prior to a request of said data; and creating multiple composite copies of said templates and selected and differing portions of said variable data in multiples, not necessarily in consecutive order.

17. The computer storage medium of claim 16 wherein said computer process further comprises the step of:

saving said composite copies with links in said composite page, said links linking order and user selectivity for subsequent composite pages.

18. The computer storage medium of claim 15 wherein said computer process further comprises the step of:

selecting a single template page;

selecting a multiplicity of pages of variable data arranged in linked order preferred by the user; and creating said composite document by merging said template and each page of variable data when called for by the user.

19. The computer storage medium of claim 18 wherein said computer process further comprises the step of:

storing said composite pages in linked files for later use by others.

20. The computer storage medium of claim 15 wherein said computer process further comprises the steps of:

initializing a database in accordance with a user selected topic;

creating links to sections of data base information or data in accordance with a preselected data base query by user;

sorting said linked sections of data base information or data in accordance with user commanded sort order;

constructing or building a composite dynamic page on the fly by said user, and retrieving successive composite pages by said links at the designation by said user.

21. A method of displaying multiple, user preferentially linked pages of at least one multi-paged document on a display screen adapted for viewing of data, said method comprising the steps of creating a template for simulating a windowed-data display within an application program, said template having a first area for displaying substantially static data on said display screen, and a second area for displaying variable data therein; and providing a control on said first area for permitting a user to specify data for viewing in said second area;

simulating a windowed-data display on said display by displaying said first area and said second area within a single application window of said application program, said control in said first area providing a visual link to said second area, and said control actuating the loading of new data into said second area responsive to selection of said control by the user, whereby the user observing the display screen receives the perception of a dynamic information display while preserving the navigational or location context of the data being viewed.

22. The method of claim 21 for displaying multiple, user preferentially linked pages of at least one multi-paged document on a display screen adapted for viewing of data, said method further comprising the steps of:

creating said template of substantially static user data defining a predetermined area on a display screen prior to a request of said data; and creating multiple composite copies of said templates and selected and differing portions of said variable data in multiples, not necessarily in consecutive order.

23. The method of claim 22 for displaying multiple, user preferentially linked pages of at least one multi-paged document on a display screen adapted for viewing of data, said method further comprising the step of:

saving said composite copies with links reflected in a composite page, said links linking the order and user selectivity for subsequent composite pages.

24. The method of claim 21 for displaying multiple, user preferentially linked pages of at least one multi-paged document on a display screen adapted for viewing of data, said method further comprising the steps of:

selecting a single template page;

selecting a multiplicity of pages of variable data arranged in linked order preferred by the user; and creating a composite document by merging said template and each page of variable date when called for by the user.

25. The method of claim 24 for displaying multiple, user preferentially linked pages of at least one multi-paged document on a display screen adapted for viewing of data, said method further comprising the step of:

storing said composite pages in linked files.

26. The method of claim 21 for displaying multiple, user preferentially linked pages of at least one multi-paged document on a display screen adapted for viewing of data, said method further comprising the steps of:

initializing a database in accordance with a user selected topic;

creating links to sections of data base information or data in accordance with a data base query by user.

27. The method of claim 26 for displaying multiple, user preferentially linked pages of at least one multi-paged document on a display screen adapted for viewing of data, said method further comprising the steps of:

sorting said linked sections of data base information or data in accordance with user commanded sort order.

28. The method of claim 27 for displaying multiple, user preferentially linked pages of at least one multi-paged document on a display screen adapted for viewing of data, said method further comprising the steps of:

constructing or building a composite dynamic page on the fly; and retrieving successive composite pages by said links at the designation.

29. A method of displaying multiple, user preferentially linked pages of at least one document on a display screen adapted for web or network viewing of pages of data by a browser program, said method comprising the steps of:

creating a template page having a first predetermined substantially static area on a display screen;

creating a second predetermined area on said template page to simulate the appearance of a variable-data window on said display screen within said browser program, said second predetermined area having the capability of receiving a user requested subsection of data therein;

generating a plurality of subsections linked to said template;

providing a user selectable control on said first predetermined area for permitting the user to select specific linked subsections of data for viewing in said second predetermined area on said template page in response to selection by a user; and creating a multiplicity of composite pages comprising said template page and said subsections for call by users with said browser program and for display on said display screen;

displaying said composite pages with a single application window of said browser program to simulate simulating a windowed-data display on said screen, whereby the user observing the screen receives the perception of a dynamic information display while preserving the navigational or location context of the data being viewed.

30. The method of claim 29 for displaying multiple, user preferentially linked pages of at least one document on a display screen adapted for web or network viewing of pages of data, said method further comprising the step of:

storing said composite pages for later recall by a user.

31. A method of creating composite pages of static and variable data for receipt on a display screen associated with a display monitor in a networking environment, said method comprising the steps of:

creating a template page having a first area of substantially static data;

creating a second static area within said template page to introduce subsections of variable data in response to a viewer/user selection;

creating ordered and linked subsections of data;

creating a composite page for viewing in said display screen by merging said template page and said subsections in linked order;

rationalizing said subsections and said template page to permit selection of subsections on said composite page when viewed on said display screen by the viewer/user; and simulating a windowed-data display on said display by displaying said first area and said second static area within at least a single application window, whereby the first area provides a structural or navigational framework to the viewer/user for the second static area and the variable subsections that the viewer/user can direct to be changed.

32. Apparatus for creating composite pages of static and variable data for receipt on a display screen associated with a display monitor in a computing system, the computer system having a processor, memory, input-output section, a keyboard, display monitor and a storage subsystem for storing programs and data therein and an operating system for said computer system, said apparatus comprising:

a template page storage device for storing a template page simulating a windowed-data display of an application program, said template page having a first area of substantially static data and a second area for displaying variable data selected by a user on said page, the static data in said first area providing for a structural or navigational framework to the viewer/user for data contained in said second area;

link controls configured to link a plurality of ordered and linked subsections of data stored in said storage subsystem;

a retrieving device configured to receive said template page and one by one pages of linked subsections of data into said memory and for merging said template and individual ones of said pages of linked subsections into said second static area of said template to thereby create a plurality of composite pages in memory; and a rationalizer configured to rationalize said subsections and said template to permit selection of selected composite documents when called up for reviewing on a display by the user.

33. The apparatus of claim 32 for creating composite pages of static and variable data for receipt on a display screen associated with a display, said apparatus further comprising:

a browser control configured to control said retrieving device to create said composite pages.

34. A computer program product including a computer usable medium having computer readable code thereon, said medium for causing data to be written into at least the memory of a computer system, comprising:

computer readable code configured to permit user preferentially linked pages of at least one multi-paged document to be displayed on a display screen adopted for web or network viewing of selected data from a network by a browser program;

computer readable code configured to create at least one template, said template for simulating a windowed-data display within said browser program, said template comprising substantially static user data defining a predetermined area on a display screen;

computer readable code configured to create a window on said screen having the capability of receiving a variable but requested grouping of data therein;

computer readable code configured to create a control on said static portion of said display screen for permitting the user to specify groupings of data for reviewing in said variable window in response to a selection by a user;

computer readable code configured to simulate a windowed-data display on said display screen by displaying said static user data and said variable data within at least a single application window, whereby when the computer readable program code is loaded into a computer and is operating, the user observing the screen receives the perception of a dynamic information display while preserving the navigational or location context of the data being viewed.

35. A computer program storage medium readable by a computing system and encoding a program of instructions for executing a computer process for displaying multiple, user preferentially linked pages of at least one multi-paged document on a display screen adapted for web or network viewing of from a network by a browser program, said computer process comprising the steps of:

creating a template for simulating a windowed-data display within said browser program, said template having a first area for displaying substantially static data on said display screen and a second area for displaying variable data therein;

providing a control on said static first area for permitting the user to specify data for viewing in said second area in response to a selection of data for display; and simulating a windowed-data display on said display by displaying said first area and said second area within a single application window of said browser program, whereby the user observing the screen receives the perception of a dynamic information display while preserving the navigational or location context of the data being viewed.

36. The computer storage medium of claim 35 wherein said computer process further comprises the steps of:

preparing said template of substantially static user data defining a predetermined area on a display screen prior to a request of said data; and creating multiple composite copies of said templates and selected and differing portions of said variable data in multiples, not necessarily in consecutive order.

37. The computer storage medium of claim 36 wherein said computer process further comprises the step of:

saving said composite copies with links in said composite page, said links linking order and user selectivity for subsequent composite pages.

38. The computer storage medium of claim 35 wherein said computer process further comprises the step of:

selecting a single template page;

selecting a multiplicity of pages of variable data arranged in linked order preferred by the user; and creating said composite document by merging said template and each page of variable date when called for by the user.

39. The computer storage medium of claim 38 wherein said computer process further comprises the step of:

storing said composite pages in linked files for later use by others.

40. The computer storage medium of claim 35 wherein said computer process further comprises the steps of:

initializing a database in accordance with a user selected topic;

creating links to sections of data base information or data in accordance with a preselected data base query by user;

sorting said linked sections of data base information or data in accordance with user commanded sort order;

constructing or building a composite dynamic page on the fly by said user, and retrieving successive composite pages by said links at the designation by said user.

* * * * *